UNITED STATES PATENT OFFICE.

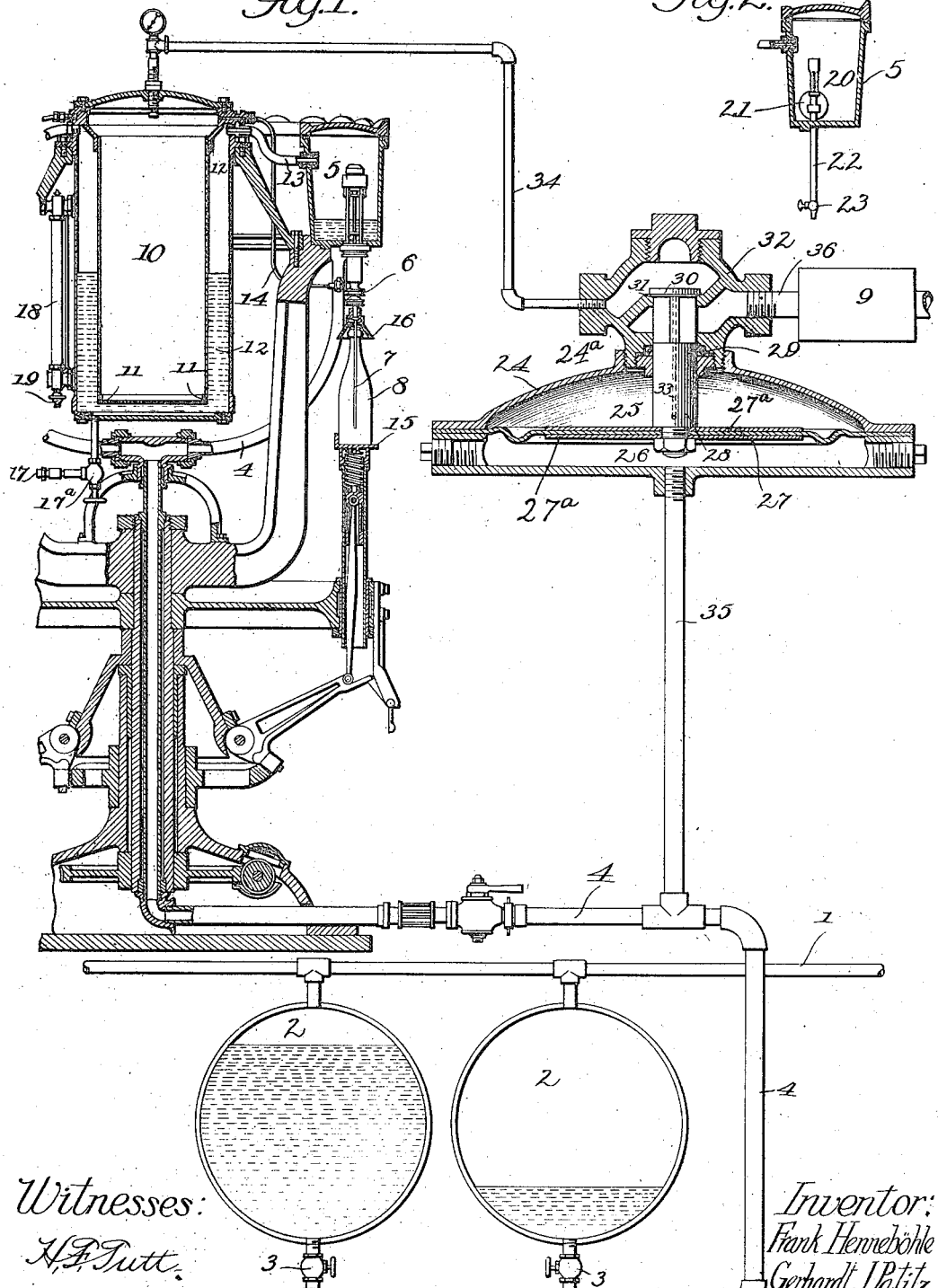

FRANK HENNEBÖHLE, OF CHICAGO, AND GERHARDT J. PATITZ, OF OAK PARK, ILLINOIS.

PACKAGING LIQUIDS.

1,147,861.  Specification of Letters Patent.  Patented July 27, 1915.

Application filed December 29, 1911. Serial No. 668,389.

*To all whom it may concern:*

Be it known that we, FRANK HENNEBÖHLE and GERHARDT J. PATITZ, citizens of the United States, residing at Chicago and Oak Park, respectively, in the county of Cook and State of Illinois, have invented certain new and useful Improvements in Packaging Liquids, of which the following is a specification.

This invention relates to apparatus for transferring beer and other charged liquids from a vat to bottles, barrels, or other containers. In such apparatus it is common to use air or other gas under pressure for the following purposes: (*a*) to force the liquid from the supply vat to the filling tank of the racking machine or bottle filler; (*b*) to counterbalance the upward pressure of the liquid in said filling tank for the purpose of maintaining constant the height of the liquid in the tank; (*c*) to fill the bottle, keg, or other container with counterbalancing air pressure for the purpose of maintaining the liquid pressure while flowing into the container in order to prevent foaming of the liquid. As the level of the liquid in the supply vat is lowered through the drawing off of the liquid, the hydrostatic pressure due to the height of the liquid in the vat is decreased, and it becomes necessary to increase the air pressure in the vat or to decrease the counterbalancing pressure supplied to the filling tank of the machine in order to maintain constant the level of the liquid in the filling tank. On the other hand, when a vat becomes empty, and the supply is drawn from a full vat, the hydrostatic pressure in the vat is increased, and it becomes necessary to decrease accordingly the air pressure in the vat, or increase the pressure in the filling tank.

It has been proposed to maintain the necessary relation between the air pressure in the supply vat and the counterbalancing air pressure in the tank by means of a pressure regulator controlling the air pressure in the vat and operated by the pressure at the bottom of the vat due to the air and the liquid therein, and to use a separate independent regulator controlling the counterbalancing air pressure in the filling tank. But this method has proven undesirable because two separate pressure regulators which are required to constantly vary the pressure will not operate uniformly. It was also proposed to maintain the necessary relation between the two pressures by the use of a float valve in the filling tank, which maintained constant the level of the liquid in the tank by opening the valve when the liquid fell below the predetermined point and allowing the air to escape, at the same time omitting the regulator controlling the pressure on the vat, and using, in addition to the float, a regulator for controlling the pressure in the tank. When practising this method, it has been found necessary to set the regulator for the counterbalancing air pressure in the tank so as to deliver an excess pressure, air being constantly wasted through the float valve to relieve this pressure, thus causing constant waste of energy. Also, by the use of either of these methods the pressure in the tank, and hence the pressure of the liquid passing therefrom into the container, constantly changes. It therefore becomes necessary to vary constantly the counterbalancing pressure in the container in order to prevent escape of compressed carbon dioxid or other gases from the liquid. This object has been arrived at by the introduction of a pressure-reducing valve in the air supply pipe passing to the tank and thus reducing the pressure of the air passing to the tank below that of the container, and adjusting, as the liquid supply vat is lowered, this reducing valve. This necessarily involved much additional attention on the part of the operator, and also made necessary a still greater excess pressure which was being relieved constantly by the float valve in order to maintain the proper relation between the pressure in the tank and the pressure in the container. It will be noticed that the pressure in the container must be greater than that in the tank for the reason that the pressure of the entering liquid is equal to the pressure in the tank, plus the pressure due to the height of the liquid above its point of entrance. So that there should always be a constant excess pressure in the container over the pressure in the tank.

The object of our invention is to obviate the uncertainties due to the use of separate regulators for the vat pressure and the counterbalancing pressure in the tank and in the container, and to avoid undue waste of the compressed air. This object we attain by using air-pressure-reducing mechanism to maintain the proper excess pressure in the container over the pressure in the tank, and using a regulator to control the pressure on the air passing to this mechanism, which is controlled by the combined pressure due to the hydrostatic and pneumatic pressures in the supply vat. When this pressure increases or decreases, the regulator controlled thereby will correspondingly increase or decrease the pressure in both the filling tank and the container, maintaining constant the excess pressure in the container. At the same time a float valve is used to maintain a constant liquid level in the filling tank, the pressure due to the compressed air on the liquid in the supply vat remaining without any special regulation.

In the accompanying drawings, Figure 1 is a diagram illustrating one embodiment of our invention, and Fig. 2 is a section of a portion of the filling tank showing the float valve used therein.

The drawings are merely diagrammatic, the liquid supply vats being reduced in size as compared with the bottle-filling machine, and the pressure-regulating device being exaggerated in size. For the purpose of illustrating the invention, we have shown this system as including a bottle filler, but it will be understood that the invention is equally applicable to a racking machine.

Compressed air or other suitable gas under pressure enters through the pipe 1 from some suitable air compression mechanism into the supply vats 2. The liquid from one of the vats is forced thereby through one of the valves 3 and the pipes 4 into the filling head 5. From this filling head it passes through the valve 6 and the tube 7 into the container 8. Counterbalancing air enters from some suitable air-compression mechanism through the air strainer 9 into the high pressure chamber 10 of the air-pressure-reducing mechanism; thence through perforations 11 in the bottom of this chamber through the water contained in chamber 12, and thence through the pipe 13 into the filling tank. The high pressure chamber 10 is connected by means of the tube 14 and the air passage in the valve 6 with the container 8. It will thus be seen that the air pressure in the container is maintained higher than the air pressure in the tank, the container being connected with the high pressure chamber of the reducing mechanism and the tank being connected with the low pressure chamber.

The filling valve 6 may be of any suitable form, as, for example, that disclosed in Patent No. 948,463. This valve is so arranged that when the container is placed upon the table 15 and raised by means of the raising mechanism below up against the receiving bell 16 of the valve, the air passage connecting the container with the tube 14 will be opened. Counterbalancing air will then pass into the container. When the pressure in the container is sufficiently great the liquid valve in the valve 6 will be opened thereby, and liquid from the tank will pass through the tube 7 into the container.

It is desired to maintain the pressure of the entering liquid equal to the pressure in the container. It is evident, however, that as the container fills, the pressure forcing the liquid therein will diminish because of the increase in height of the liquid in the container. Hence it becomes necessary to produce in the container a pressure equal to the downward pressure on the liquid in the tube at the point to which it is desired to have the liquid rise in the container when sufficiently filled. To vary the relative pressures of the air in the container and the entering liquid, it is necessary only to vary the height of the water in the low pressure chamber 12. Water may be forced into this chamber from any suitable water supply under pressure through the pipe 17 and the valve 17$^a$. The height of the water may be gaged by the glass gage 18, and hence the operator may maintain the water at the proper height to fill the containers to the desired point, or may, while operating, vary the height to which the containers are filled, by varying, by means of the valve 17$^a$, the height of the liquid in the tank. If it is desired to lower the liquid, it may be drawn off by the pet cock 19.

The reasons why the height of the water determines the height to which the liquid will rise in the container are as follows: As stated, the pressure in the container is equal to the pressure in the high pressure chamber. The pressure of the air in the tank is equal to the pressure of the air in this chamber 10 minus the back pressure due to the effective height of the water in the chamber 12; while the pressure of the liquid entering the container is equal to the pressure in the tank plus the pressure due to the liquid above the point of entrance, or, as the container fills, above the liquid in the container. Therefore, if the height of the liquid in the tank above the liquid in the container is equal to the effective height of the water, the pressure of the entering liquid and the air in the container will become equal and the liquid will cease to flow. For these reasons it will be seen that the height of the water determines the height to which the liquid will rise in the container.

In order to reduce, if it should be necessary, the counterbalancing pressure in the tank and in the container as the level in the liquid supply vat lowers, we use an air vent of any suitable character, as, for example, the construction disclosed in Patent No. 940,624, and consisting of a float valve 20 actuated by a float 21 in the tank 5. This valve is opened by the float when the liquid in the tank sinks to a predetermined level, and allows the excess pressure to be relieved by the escape of air through the valve and the pipe 22 and the regulating pet cock 23. If, for instance, the level of the liquid in the supply vat lowers, the level of the liquid in the tank 5 lowers correspondingly, unless the pressure in the tank is relieved, and this is brought about by means of the float valve, as stated. As this, however, would not materially affect the counterbalancing air pressure in the container, we also use an air pressure regulator 24$^a$ which comprises the valve casing 32 containing the valve disk 30 and port 31 and the diaphragm casing 24 having chambers 25 and 26 separated by a diaphragm 27. The valve stem 28 is attached to this diaphragm and it passes through the stuffing box 29, and supports the valve disk 30 which is seated in the valve port 31 of the valve casing 32. The valve stem is thus balanced so far as gas under pressure entering the casing from pipe 36 is concerned; the gas tends to move it upward and downward with equal forces. The diaphragm, however, is weighted by the heavy valve stem 28 and the plates 27$^a$ which clamp the stem to the diaphragm. The upper chamber 25 of the regulator is connected freely by means of the passageway 33, through the valve stem, and the pipe 34 with the high pressure chamber 10, and hence when the container is being filled the chamber 25 is also freely connected with the container. The chamber 26 of the regulator is connected by means of a pipe 35 to the liquid supply pipe 4, and hence is under a pressure which is determined by the pressure in the liquid supply vat in use.

As will be shown hereinafter, the pressures in the chambers 25 and 26 of the regulator are maintained approximately equal, hence when the pressure in chamber 26 is increased, as will be the case when passing for the supply from an empty vat to a full one, the diaphragm will be pressed upward, the valve port 31 opened, and compressed air will pass through the port from the pipe 36 into the high pressure chamber 10, and from thence into both the filling tank and the container, compensating for the increased hydrostatic pressure in the vat, so that the liquid in the filling tank will not be raised in height, and so that the pressure in the container will be increased to compensate for the necessary increase in pressure in the tank.

As the liquid in the vat is drawn off, the pressure in the chamber 26 will decrease, the valve disk 30 will be lowered, diminishing the supply of air passing through the port 31, and ultimately, perhaps, closing the port. At the same time the liquid in the tank 5 will sink, the float valve will then relieve the excess pressure in the tank restoring the level; air will pass from the high pressure chamber into the tank; this in turn, if necessary, will be allowed to escape through the float valve; the pressure in the high pressure chamber will thus be reduced; and accordingly the pressure in the container, as well as in the filling tank will be reduced; the pressure in the container in excess of that in the tank remaining constant. It will thus be seen that the excess pressure in the container will always remain substantially constant. The constancy of this excess will depend upon the height of the regulator above the supply vat, for the following reasons: The downward pressure on the diaphragm 27 will be determined by the pressure in the chamber 10. The upward pressure on the diaphragm will be affected by the height of the liquid in the filling tank 5 above the diaphragm. If the regulator is placed low so that the upward pressure is maintained greater than the downward, there will be a constant passage of compressed air into the chamber 10, and if need be, out of the float valve. And the amount of air passing will depend upon the height the valve disk is raised. Variations of the pressure due to any cause will cause fluctuations of the height of the disk, and corresponding fluctuations in the amount of compressed air escaping at the float valve. On the other hand, if the regulator is placed high with reference to the filling tank so that the downward pressure is maintained greater than the upward pressure, the valve will be held closed, by the greater downward pressure, substantially all the time. In either of these cases the sensitiveness would not be so great as when the upward and downward pressures on the diaphragm are substantially equal. The valve then acts as a reducing valve which delivers, not constant pressure but a varying pressure which is determined by and is equal to the pressure on the lower side of the diaphragm. A slight increase in pressure from below will cause a slight opening of the valve, and a correspondingly slight passage of air into the upper chamber of the valve, which will thus close the valve as soon as the pressure equals that in the lower chamber. Or a slight decrease in pressure in the lower chamber will be followed by a slight excess pressure above and in the filling tank and the float will immediately relieve the excess. It is usual in practice to increase the pressure upon the supply vats before they are empty, and, as a consequence, it frequently happens that the pressure due to the supply is thus increased, although the height of liquid in the vat is decreasing. The valve then automatically increases correspondingly the pressure in the filling tank. It will be seen that this regulator, controlling as it does the pressure in chamber 10, may be used with any member of filling devices set in the filling tank 5 without any change in the position or the construction of the device. And it will be evident that by the use of the regulator the pressure in the container in excess of that in the filling tank will be maintained constant when variations in the pressure on the liquid in the filling tank occur for any reason whatever. Any variation in air pressure on the supply liquid or variations in the pressure of the air entering the valve 32 will be fully compensated for.

We do not limit ourselves to the details of construction herein shown, for various modifications within the scope of the claims will occur to those skilled in the art.

We claim as our invention:

1. In a liquid filling machine, the combination of a filling tank connected with a source of liquid supply; filling mechanism connected to said tank; and means for supplying gas under pressure to said tank and to a container to be filled, said means comprising hydraulic means for maintaining a constant excess pressure on the liquid entering said container over the gas pressure in said container.

2. In a liquid filling machine, the combination of a filling tank connected with a source of supply under pressure; filling mechanism connected with said tank; means for supplying gas pressure to said tank and to the container to be filled comprising means for maintaining the pressure in the container greater than that in the tank; and automatic means depending upon the head of liquid in said tank for controlling at all times the gas pressure supplied by said gas-supplying means.

3. The combination of a liquid tank; means for supplying liquid to said tank; means for removing liquid from said tank; means for supplying gas pressure to said tank; and means depending upon the gas pressure and the head of liquid in said tank for regulating at all times the flow of gas in said gas-pressure-supplying means.

In testimony whereof we affix our signatures in the presence of two witnesses.

FRANK HENNEBÖHLE.
GERHARDT J. PATITZ.

Witnesses:
C. PAUL PARKER,
GEORGE L. CHINDAHL